United States Patent
Goehl et al.

(10) Patent No.: US 12,422,854 B2
(45) Date of Patent: Sep. 23, 2025

(54) METHOD, COMPUTER PROGRAM PRODUCT, COMPUTER-READABLE MEDIUM, CONTROL UNIT, AND VEHICLE COMPRISING THE CONTROL UNIT FOR DETERMINING A COLLECTIVE MANEUVER OF AT LEAST TWO VEHICLES

(71) Applicant: Bayerische Motoren Werke Aktiengesellschaft, Munich (DE)

(72) Inventors: Kira Goehl, Munich (DE); Julian Loechner, Unterschleissheim (DE); Jens Schulz, Munich (DE); Moritz Werling, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1054 days.

(21) Appl. No.: 16/657,025

(22) Filed: Oct. 18, 2019

(65) Prior Publication Data
US 2020/0050214 A1 Feb. 13, 2020

Related U.S. Application Data

(63) Continuation of application No. PCT/EP2018/055452, filed on Mar. 6, 2018.

(30) Foreign Application Priority Data

Apr. 26, 2017 (DE) ............ 10 2017 206 987.2

(51) Int. Cl.
*G05D 1/00* (2024.01)
*G06V 20/58* (2022.01)

(52) U.S. Cl.
CPC ......... *G05D 1/0287* (2013.01); *G05D 1/0212* (2013.01); *G06V 20/58* (2022.01); *G06V 20/584* (2022.01)

(58) Field of Classification Search
CPC ............ G05D 1/0287; G05D 1/0212; G05D 2201/0213; G06V 20/58; G06V 20/584; G08G 1/167
See application file for complete search history.

(56) References Cited

U.S. PATENT DOCUMENTS 9,165,477 B2 * 10/2015 Wilson ............... G01C 21/3697
2008/0065328 A1 * 3/2008 Eidehall ................. G01S 7/295
701/301

(Continued)

FOREIGN PATENT DOCUMENTS

CN 102915465 A 2/2013
CN 104567891 A 4/2015

(Continued)

OTHER PUBLICATIONS

PCT/EP2018/055452, International Search Report dated Jun. 20, 2018 (Two (2) pages).

(Continued)

*Primary Examiner* — Frederick M Brushaber
(74) *Attorney, Agent, or Firm* — Crowell & Moring LLP

(57) ABSTRACT

A method for determining a collective maneuver of at least two vehicles includes receiving a state of a first vehicle and a state of at least one further vehicle in an environment of an ego vehicle, and determining a current formation for the first vehicle and the at least one further vehicle on the basis of the received state of the first vehicle and the received state of the at least one further vehicle in the environment of the ego vehicle, the current formation comprising a relative arrangement of the first vehicle and of the at least one further vehicle with respect to a roadway. The method also includes determining a set of collective maneuvers on the basis of the current formation, where each collective maneuver of the set of collective maneuvers comprising a sequence of formations from the current formation to an end formation. A (Continued)

trajectory for the first vehicle and a trajectory for the at least one further vehicle is calculated for a collective maneuver from the set of collective maneuvers, and the collective maneuver from the set of collective maneuvers is determined based on the calculated trajectories of the collective maneuver from the set of collective maneuvers and a motion of the first vehicle and of the at least one further vehicle sensed by means of a sensor system of the ego vehicle.

19 Claims, 7 Drawing Sheets

(56) References Cited

U.S. PATENT DOCUMENTS

| | | | | |
|---|---|---|---|---|
| 2010/0256852 | A1* | 10/2010 | Mudalige | G08G 1/22 701/24 |
| 2012/0053755 | A1* | 3/2012 | Takagi | G01S 7/4808 701/1 |
| 2015/0160653 | A1* | 6/2015 | Cheatham, III | G05D 1/0088 701/23 |
| 2015/0266455 | A1* | 9/2015 | Wilson | G05D 1/0276 701/93 |
| 2016/0280265 | A1* | 9/2016 | Hass | B62D 15/0265 |
| 2016/0375901 | A1* | 12/2016 | Di Cairano | B60W 30/09 701/26 |

FOREIGN PATENT DOCUMENTS

| | | |
|---|---|---|
| DE | 10 2011 005 844 A1 | 9/2012 |
| DE | 10 2012 005 245 A1 | 9/2012 |
| DE | 10 2014 211 507 A1 | 12/2015 |
| DE | 10 2015 217 891 A1 | 3/2017 |

OTHER PUBLICATIONS

German Search Report issued in German counterpart application No. 10 2017 206 987.2 dated Dec. 11, 2017, with Statement of Relevancy (Ten (10) pages).

English-language Chinese Office Action issued in Chinese application No. 201880009506.5 dated Jun. 3, 2021 (Ten (10) pages).

* cited by examiner

METHOD, COMPUTER PROGRAM PRODUCT, COMPUTER-READABLE MEDIUM, CONTROL UNIT, AND VEHICLE COMPRISING THE CONTROL UNIT FOR DETERMINING A COLLECTIVE MANEUVER OF AT LEAST TWO VEHICLES

CROSS REFERENCE TO RELATED APPLICATIONS

This application is a continuation of PCT International Application No. PCT/EP2018/055452, filed Mar. 6, 2018, which claims priority under 35 U.S.C. § 119 from German Patent Application No. 10 2017 206 987.2, filed Apr. 26, 2017, the entire disclosures of which are herein expressly incorporated by reference.

BACKGROUND AND SUMMARY OF THE INVENTION

The invention relates to a method for determining a collective maneuver of at least two vehicles. The invention also relates to a computer program product, to a computer-readable medium, to a control unit, and to a vehicle comprising the control unit for determining a collective maneuver of at least two vehicles.

Autonomously driving vehicles can use a movement prediction to estimate movements of other vehicles and further road users. For example, a maneuver currently being carried out or a future maneuver of a vehicle can be estimated. The set of possible maneuvers of a vehicle is often manually determined by a manufacturer of the vehicle and is made available to the vehicle.

An object of the invention is therefore to efficiently improve determination of a collective maneuver of vehicles. In particular, an object of the invention is to efficiently determine a collective maneuver of a first vehicle relative to at least one further vehicle.

According to a first aspect, the invention is distinguished by a method for determining a collective maneuver of at least two vehicles. The collective maneuver preferably comprises common maneuvers of at least two vehicles. Generally, the method can relate two or more vehicles to one another and can determine a collective maneuver for these vehicles. A vehicle may be, for example, an ego vehicle or a vehicle which can be captured by a sensor system of the ego vehicle. The method can determine one or more collective maneuvers for combinations of vehicles in which the ego vehicle is part of the collective maneuver or the ego vehicle is not part of the collective maneuver, for example if the ego vehicle determines a collective maneuver for at least two vehicles in an environment of the ego vehicle. The ego vehicle is preferably an autonomously driving vehicle, in particular an autonomously driving motor vehicle. The collective maneuver may comprise a driving maneuver of the ego vehicle. The method comprises receiving a state of a first vehicle, for example an ego vehicle or another vehicle, and a state of at least one further vehicle in an environment of an ego vehicle. The environment may comprise a road section of the ego vehicle which can be captured by a sensor system of the ego vehicle. The state may comprise, for example, a position and/or a speed. The state of the first vehicle and/or of the at least one further vehicle can be received by one or more sensors of the ego vehicle, referred to below as the sensor system of the ego vehicle, and/or by control units of the ego vehicle which are connected to the sensor system. The method also comprises determining a current formation for the first vehicle and the at least one further vehicle on the basis of the received state of the first vehicle and the received state of the at least one further vehicle in the environment of the ego vehicle, wherein the current formation comprises a relative arrangement of the first vehicle and of the at least one further vehicle with respect to a road, in particular one or more lanes of a road. The method also comprises determining a set of collective maneuvers, in particular a set of possible collective maneuvers, on the basis of the current formation, wherein a collective maneuver in the set of collective maneuvers comprises a sequence of formations from the current formation to an end formation.

The method also comprises calculating at least one trajectory for the first vehicle and at least one trajectory for the at least one further vehicle for a collective maneuver from the set of collective maneuvers. The trajectories are preferably calculated in such a manner that the collective maneuver is possible by means of the calculated trajectories, that is to say can be traveled by the vehicles in the collective maneuver. Finally, the method comprises determining the collective maneuver on the basis of the calculated trajectories for the collective maneuver from the set of collective maneuvers and a movement of the first vehicle and of the at least one further vehicle, as captured by a sensor system of the ego vehicle.

Determining a set of possible collective maneuvers for at least two vehicles advantageously makes it possible to dynamically react to a traffic scenario in which, for example, one or more further vehicles and/or one or more obstacle objects, for example a stationary or parked vehicle, in the environment of the ego vehicle must be taken into account in the maneuver. The ego vehicle can therefore adapt flexibly to new traffic scenarios without these new traffic scenarios having to have been previously stored in the ego vehicle. Furthermore, efficient calculation of the maneuver can be ensured by determining a sequence of formations for each maneuver. If the method is carried out in a step size of one second, for example, the ego vehicle can select a collective maneuver from the set of collective maneuvers in each time step, which collective maneuver is determined on the basis of a captured movement of further vehicles. The ego vehicle can therefore always carry out an optimum collective maneuver in order to reach a predefined destination, for example.

According to one advantageous configuration, the first vehicle may be the ego vehicle, and/or the state of the first vehicle and/or the state of the at least one vehicle may comprise a preferably lane-accurate position of the respective vehicle. This makes it possible to efficiently determine a collective maneuver for the ego vehicle. Furthermore, a current traffic situation can be captured in a more precise manner and therefore a current formation can be captured in a more precise manner.

According to another advantageous configuration, the method can also comprise determining a state of one or more obstacle objects in the environment of the ego vehicle. Furthermore, the determination of the current formation can be carried out on the basis of the state of the first vehicle, for example the ego vehicle, the state of the at least one further vehicle and/or the state of the obstacle objects, and the current formation may comprise a relative arrangement of the first vehicle, for example the ego vehicle, the at least one further vehicle and the obstacle objects with respect to a road. This makes it possible to efficiently determine a formation which comprises a traffic situation having one or more obstacle objects.

According to another advantageous configuration, the sequence of formations from the current formation to the end formation may specify a predefined set of pairs of lateral relationships between the first vehicle and the at least one or more further vehicles and/or a predefined passing order of the first vehicle and of the at least one or more further vehicles, and/or a collective maneuver from the set of collective maneuvers may comprise a trajectory of the first vehicle and a trajectory of the at least one or more further vehicles, and/or the trajectory of the first vehicle and the trajectory of the at least one or more further vehicles may be homotopic with respect to the current formation and an identical end formation. In this case, homotopic means that the trajectories of all vehicles which are involved in a maneuver and have the current formation as the starting formation and the same end formation allow a continuous transformation without resulting in a collision with an obstacle object and/or a collision between two vehicles. This makes it possible to efficiently calculate a collective maneuver.

According to another advantageous configuration, the relative arrangement of the current formation may be lane-accurate, and/or the current formation and the end formation may comprise at least one area which is free of vehicles and/or an obstacle object. This makes it possible for the maneuver to be precisely captured and efficiently calculated by the ego vehicle.

According to another advantageous configuration, the determination of a set of collective maneuvers may comprise generating a tree data structure for formations, wherein the current formation is a root element of the tree data structure. Furthermore, the determination of a set of collective maneuvers may comprise calculating a further formation by changing the relative arrangement of the first vehicle, for example the ego vehicle, and/or of the at least one or more further vehicles in the starting formation using a predefined set of discrete movement actions, adding the further formation to the tree data structure, and checking whether the further formation is an end formation. If the further formation is an end formation, the sequence of formations from the current formation to the end formation can be added as a collective maneuver to the set of collective maneuvers and a collective maneuver for the set of collective maneuvers can therefore be determined. This makes it possible to efficiently calculate or determine a collective maneuver taking into account the at least one further vehicle and/or one or more obstacle objects.

According to another advantageous configuration, the determination of a set of maneuvers may also comprise, if the further formation is not an end formation, calculating a further formation by changing the relative arrangement of the ego vehicle and/or of the at least one further vehicle in the current formation or in the added further formation using a predefined set of discrete movement actions. The determination of a set of maneuvers may also comprise adding the further formation to the tree data structure, checking whether the further formation is an end formation, and continuing the determination of a set of maneuvers on the basis of a result of checking whether the further formation is an end formation, wherein the determination of the set of maneuvers is continued until the further formations have been completely calculated with respect to the predefined set of discrete movements. This makes it possible to efficiently calculate or determine a complete set of possible maneuvers of the ego vehicle.

According to another advantageous configuration, the trajectory for a maneuver from the set of maneuvers may be cost-optimized with respect to at least one vehicle-specific parameter and/or with respect to at least one maneuver-specific parameter. This makes it possible to calculate an efficient trajectory for each possible maneuver of the ego vehicle.

According to another aspect, the invention is distinguished by a computer program product for determining a maneuver of an ego vehicle, comprising instructions which, when the computer program product is executed by a computer or a control unit, cause the computer or the control unit to carry out the method described above.

According to another aspect, the invention is distinguished by a computer-readable medium which comprises instructions which, when executed on a computer or a control unit, carry out the method described above.

According to another aspect, the invention is distinguished by a control unit for determining a maneuver of an ego vehicle, wherein the control unit comprises means for carrying out the method described above.

According to another aspect, the invention is distinguished by a vehicle comprising the control unit described above for determining a maneuver of an ego vehicle.

Further features of the invention emerge from the claims, the figures and the description of the figure. All features and combinations of features mentioned above in the description and the features and combinations of features mentioned below in the description of the figures and/or shown in the figures alone can be used not only in the respectively stated combination but also in other combinations or else alone.

The invention is based on the considerations explained below:

Predicting a movement of vehicles in an environment of an autonomously driving vehicle, also called ego vehicle below, is a precondition for safe, anticipatory and cooperative driving of autonomously driving vehicles. In order to determine a cooperative driving strategy, it may be useful for an autonomously driving vehicle to use an intended movement of surrounding vehicles in its own movement planning. However, intended movements cannot be directly measured. Consequently, it is necessary for an autonomously driving vehicle to estimate movements and/or maneuvers of vehicles in traffic scenarios in which there are one or more dependencies between the autonomously driving vehicle and further, different road users, for example vehicles and/or obstacle objects.

The prediction or estimation of a movement is often encumbered with a certain uncertainty. For this reason, it may be difficult to obtain a single, accurate and deterministic prediction, on the basis of which an autonomously driving vehicle can orient its own movement planning. In traffic scenarios in which road users are closely linked to one another in particular, it cannot be assumed that movements of the road users are independent of one another. This may result in the prediction of the movement of the road users and the planning of the movement of the autonomously driving vehicle not being able to be considered and tackled separately. Rather, the prediction of the movement and the planning of the movement need to be tackled together. Maneuvers on the basis of formations which describe a relative movement of a plurality of vehicles in a traffic scenario are defined below for this purpose.

Decisions for or against a maneuver can be linked, for example, by stipulating conditions which are intended to avoid a collision in a traffic scenario. Assuming that vehicles behave in a cooperative manner in a traffic situation, it is possible to plan trajectories for a given maneuver in order to reproduce human behavior in the traffic scenario. The maneuver can be compared with observations of a current movement using the planned trajectories and, if the planned trajectories differ from the current movement, the maneuver can be changed. A probability distribution of possible maneuvers can be derived using Bayesian statistics. The probability distribution can finally be used to select and carry out a particular maneuver by means of the ego vehicle.

A preferred exemplary embodiment of the invention is described below on the basis of the accompanying drawings. Further details, preferred configurations and developments of the invention emerge therefrom. In detail Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
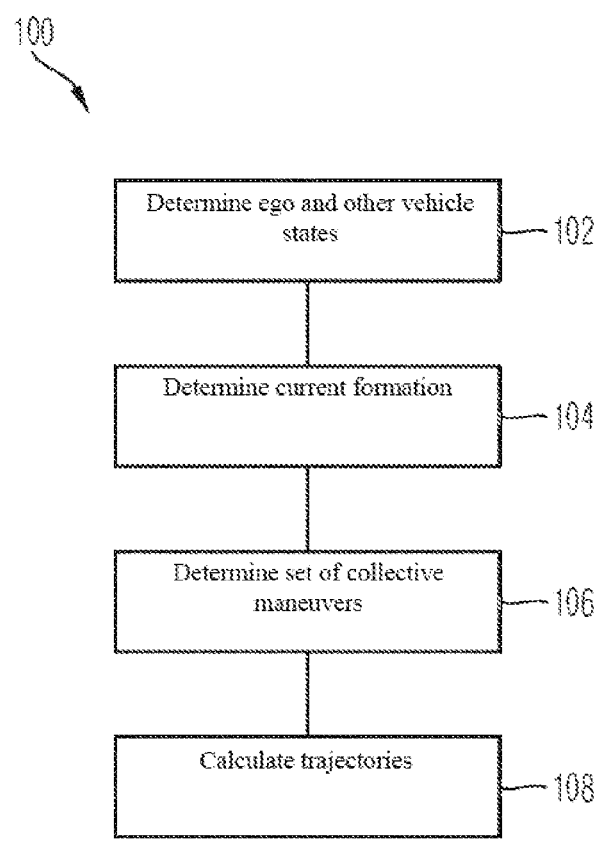
FIG. 1 schematically shows a method for determining a maneuver of an ego vehicle.

In detail, FIG. 1 shows a method 100 for determining a maneuver of an ego vehicle, in particular a driving maneuver of the ego vehicle relative to a movement of at least one further vehicle. In this case, the maneuver of the ego vehicle is collision-free, that is to say a collision with one or more further vehicles and/or obstacle objects is avoided. The maneuver may comprise, for example, overtaking and/or avoiding an obstacle object and/or another vehicle. The maneuver may be driving through an intersection, driving through a traffic circle, and/or driving into a through street. The at least one further vehicle may be, for example, a vehicle which is manually controlled by a driver or an autonomously driving vehicle. There is no need for communication between the ego vehicle and the further vehicle(s). The at least one further vehicle may be, for example, a vehicle driving in a lane in the opposite direction to the lane of the ego vehicle and/or in a lane of a through street into which the ego vehicle intends to drive. The at least one further vehicle is generally a vehicle in an environment of the ego vehicle, the movements of which influence the maneuver of the ego vehicle.

The method 100 can first of all determine 102 a state of the ego vehicle and a state of the at least one further vehicle in the environment, preferably in the immediate environment, of the ego vehicle. The state of the ego vehicle may comprise a position of the ego vehicle and/or a speed of the ego vehicle. The state of the at least one further vehicle may comprise a position of the at least one vehicle and/or a speed of the at least one vehicle. The position of the ego vehicle and of the at least one further vehicle preferably comprises a longitudinal position and a lateral position of the respective vehicle along the course of a road or a road section. The speed of a vehicle, for example of the ego vehicle and/or of the at least one further vehicle, may comprise a longitudinal speed and a lateral speed.

The position, for example a longitudinal position and/or a lateral position, can be determined with respect to a Frenét coordinate system. Furthermore, the position of the ego vehicle and of the at least one further vehicle can be determined in a lane-accurate manner. For this purpose, the determination 102 of the state may comprise receiving lane-accurate map data, for example from a server or from a local data memory integrated in the ego vehicle. In order to determine a position of a vehicle, for example of the ego vehicle and of the at least one further vehicle, with respect to a lane, it is possible to determine a box which surrounds the vehicle and has a predefined length and a predefined width. The predefined length of the box and the predefined width of the box can be determined, for example, on the basis of the length and width of a vehicle. The box can be mapped to the lane-accurate map using the position of the vehicle in order to determine the lane-accurate position of the vehicle. The box surrounding the vehicle is preferably oriented relative to a line, for example a center line, or another object of the road. This simplifies lane-accurate representation of the vehicle.

Additionally or alternatively, the method 100 can determine a state of one or more obstacle objects. The obstacle object may be situated in the environment of the ego vehicle and influences the maneuver of the ego vehicle, that is to say ignoring the obstacle object(s) could result in a collision. Consequently, the obstacle object(s) must be taken into account in the maneuver of the ego vehicle. In a similar manner to determining the state of a vehicle, a position and optionally a speed of the obstacle object can be determined. The obstacle object is preferably a static object, that is to say the speed of the obstacle object is zero. Furthermore, a box surrounding the obstacle object can be determined and can be mapped to the lane-accurate map with lane accuracy. One or more obstacle objects can therefore be taken into account when determining a maneuver of the ego vehicle. The maneuver of the ego vehicle can therefore be adapted to more complex traffic situations comprising one or more obstacle objects.

The method 100 may also determine 104 a formation for the ego vehicle and the at least one further vehicle on the basis of the determined state of the ego vehicle and the determined state of the at least one further vehicle in the environment of the ego vehicle. In this case, a formation describes a relative arrangement of objects, for example of the ego vehicle and of the at least one further vehicle, with respect to a road section in a traffic scenario. A maneuver for a traffic situation can be easily described by means of a formation. An object may be a vehicle, for example the ego vehicle and/or the at least one further vehicle, and/or an obstacle object. Each formation may comprise information relating to a two-dimensional, relative position of the objects in the traffic situation. Exact distances and/or lengths between the objects can be disregarded in a formation in order to simplify determination of formations.

In order to determine a formation, it is possible to define, for a road section, preferably for a road section without intersections, in the environment of the ego vehicle, a local Frenét coordinate system comprising the road section. The two-dimensional position of one or more vehicles, for example of the ego vehicle and of the at least one further vehicle, and the two-dimensional position of one or more obstacle objects, if present, in this road section can be determined using the local Frenét coordinate system and the determined positions can be projected into the longitudinal dimension. The vehicle(s) and the obstacle object(s) can be sorted with respect to the longitudinal dimension. The vehicle(s) and the obstacle object(s) are preferably sorted in ascending order with respect to the longitudinal position in the road section. The sorted order of vehicles and/or obstacle objects can be stored for a further calculation. The sorted order may also be expanded with a second dimension in which a lane is allocated to each vehicle or obstacle object. The lane can be allocated by means of the lane-accurate map and the mapping of the vehicles and/or obstacle objects to the lane-accurate map by means of boxes, as described above.

Figure 2:
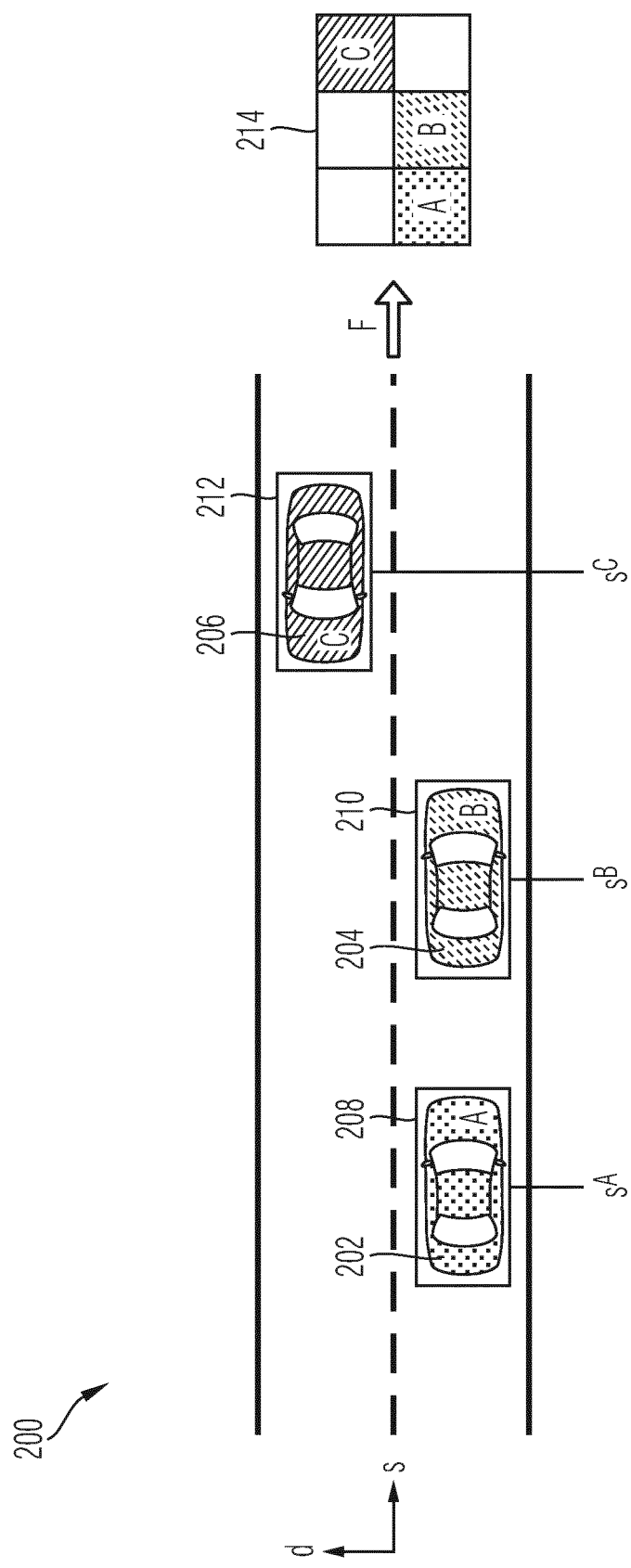
FIG. 2 schematically shows an exemplary traffic scenario and a formation derived from the traffic scenario.

FIG. 2 shows an exemplary traffic scenario 200 and a formation derived from the traffic scenario. The traffic scenario 200 comprises an ego vehicle 202, vehicle A in FIG. 2, a stationary vehicle 204 as an obstacle object, vehicle B in FIG. 2, and a further vehicle 206, vehicle C in FIG. 2, which is coming toward the ego vehicle 202. Alternatively, the ego vehicle may also be vehicle B or vehicle C in the traffic scenario 200. However, it is assumed below that vehicle A in FIG. 2 is the ego vehicle 202. The road comprises two lanes. The ego vehicle 202 and the stationary vehicle 204 are in a first lane. The further vehicle 206 is in a second lane. The boxes 208, 210, 212 which surround the vehicles 202, 204 and 206 and are used to map the vehicles 202, 204, 206 to the lane-accurate map are likewise shown in FIG. 2. The longitudinal position of the ego vehicle 202 is $s^A$, the longitudinal position of the stationary vehicle 204 is $s^B$, and the longitudinal position of the further vehicle 206 is $s^C$. As described above, a sorted order of the vehicles 202, 204 and 206 with respect to the respective longitudinal position can be created and can be linked to information relating to the respective lane. The formation 214 therefore comprises a lane-accurate position of the vehicles relative to one another.

As shown in FIG. 2 by way of example, the formation 214 can be represented as a collection of a plurality of cells. Each cell in the formation 214 is occupied by at most one vehicle or one obstacle object. Two vehicles or obstacle objects cannot be arranged in the same longitudinal column, that is to say laterally adjoining cells of an occupied cell are always free. If vehicles and/or obstacle objects overlap in the considered road section of the traffic scenario, this information is not considered any further. An allocation is effected uniquely to a cell without considering a possible overlap.

In order to determine a formation, it is likewise possible to define, for a road section having an intersection in the environment of the ego vehicle, a local Frenét coordinate system comprising the road section and the intersection. Different road sections of the intersection can be extracted using the lane-accurate map and a link of the road sections to the intersection can be derived. For this purpose, a formation for a first road section and a formation for a second road section, which crosses the first road section, can first of all be determined independently of one another. If a cell in the first formation is likewise present in the second formation, this cell is marked as an intersection cell. This is continued until all intersection cells have been marked. An intersection cell cannot be occupied by a vehicle or an obstacle object. If, for example, an intersection cell is occupied by a vehicle at the time of determining a formation, the vehicle occupying the cell can be moved to the next, subsequent normal cell. In this case, it is assumed that the intersection exit taken by a vehicle is known.

The method 100 may determine 106 a set of collective maneuvers starting from the determined, current formation, also called starting formation below. The current formation comprises at least a position of the ego vehicle and a position of a further vehicle. The set of collective maneuvers can be recalculated in each time step in which the method 100 is carried out. A time step may be, for example, a fraction of a second, 1.0 second, 1.1 seconds, 1.2 seconds, . . . , two seconds, three seconds, etc. The time step should preferably be selected to be as small as possible depending on the computing time and/or information obtained, for example one second. The set of collective maneuvers comprises possible collective maneuvers, preferably all possible collective maneuvers, in a time step. A collective maneuver from the set of collective maneuvers can be defined as a sequence of continuous formations from the starting formation to an end formation. Each formation of a collective maneuver satisfies a predefined set of conditions which specify pairs of lateral relationships and/or a passing order of one or more critical areas of the traffic scenario. A critical area may be an area of a road section which can be used by a vehicle only at a particular time or cannot be used at all during a collective maneuver. A collective maneuver from the set of collective maneuvers may comprise, for example, the ego vehicle and one or more further vehicles and/or obstacle objects and may define a movement of the ego vehicle relative to at least one further vehicle and/or obstacle object and relative to other vehicles.

In order to determine the set of collective maneuvers, the current formation of a given traffic scenario can first of all be determined, as described above in step 104 of the method 100. The set of collective maneuvers can be effected by iteratively expanding a tree data structure, wherein each node of the tree data structure corresponds to a formation. Iteratively expanding the tree data structure makes it possible to look for possible maneuvers starting from the current formation. Furthermore, iteratively expanding the tree data structure makes it possible to quickly find a possible maneuver for the ego vehicle even if the tree data structure has not yet been completely expanded.

The current formation can be used as the root element of the tree data structure. In detail, end formations and intermediate formations between the current formation as the starting formation and the end formation(s) can be determined by iteratively expanding the tree data structure. An end formation may be an intermediate formation of another path from the current formation to a further end formation. As a result, it is possible to find maneuvers which are partial maneuvers of another maneuver and it is possible to increase the number of maneuvers in the set of maneuvers, from which the ego vehicle can select or determine a maneuver to be carried out.

On the basis of the current formation as the root element, it is possible to generate a new formation on the basis of a movement, in particular a relative movement, of one or more vehicles, for example a movement of the ego vehicle and/or a movement of the at least one further vehicle. A relative movement between vehicles and/or obstacles in the traffic scenario, which is represented by the current formation, can generally be described by a predefined set of discrete actions $A=\{a_{long}, a_{left}, a_{right}\}$, from which one action is selected in order to generate a new formation. The predefined set of discrete actions may delimit a search space in which it is possible to search for a possible maneuver. An action from the set of actions describes a change with respect to a relative arrangement of objects, for example a relative arrangement of vehicles and/or obstacles, in a formation. A vehicle/action pair $(V,a) \in V \times A$ can transform a formation, for example the current formation, into a new formation.

The object which is the next object in the direction of travel with respect to the longitudinal arrangement is referred to below as the object in front or the object traveling in front irrespective of the lane. The lateral actions $a_{left}$ and $a_{right}$ represent a lane change from the right-hand lane to the left-hand lane or from the left-hand lane to the right-hand lane. The longitudinal action $a_{long}$ can represent two different actions: firstly the passing of the object in front or the object traveling in front, wherein the passing results in a change in the position with respect to the longitudinal arrangement of a formation, or secondly the passing through an intersection and the movement of the vehicle into a lane linked to the intersection.

Expanding the tree data structure makes it possible to generate formations which represent possible actions of the vehicles starting from the current formation. If the tree data structure has been completely expanded with all possible actions, all possible formations starting from the current formation are available. In order to generate the tree data structure in a more efficient manner, it is possible to define cut-off conditions which reject or do not further consider one or more paths of the tree data structure and/or limit a depth of one or more paths of the tree data structure. The cut-off conditions can be used to prevent loops in the generation of new formations, for example. Furthermore, an impossible behavior and/or an unlikely behavior of a vehicle can be excluded, compliance with traffic rules can be enforced and/or generally valid behaviors of a driver of a vehicle can be taken into account by means of the cut-off conditions. The cut-off conditions may additionally take into account driving dynamics parameters.

In order to reject and/or limit paths of the tree data structure, the following cut-off conditions can be defined, for example:
  passing in the same lane: passing a vehicle or obstacle object in front in the same lane;
  unsuitable lane change: changing to the lane of the vehicle in front if it drives toward another vehicle; carrying out a lane change to a non-existent lane;
  rearward, lateral action: changing to a lane in which driving was carried out earlier in this maneuver without having overtaken another vehicle;
  overtaking again: two vehicles which have already overtaken one another earlier in the maneuver pass one another;
  already existing, new formation: a new formation which already exists and has the same parent formation.

In order to determine a new formation as the end formation, it is possible to define conditions which must be satisfied by an end formation. For example, as a condition for an end formation, it is possible to stipulate that all vehicles with different directions of travel must have passed one another and/or that all vehicles are in a lane and have their correct direction of travel. An end formation may be an intermediate formation for another end formation. This means that the expansion of a path of the tree data structure can be continued further in an end formation until at least one of the cut-off conditions and/or all end conditions has/have been satisfied. A path from the current formation to an end formation is a maneuver as defined above. Similar maneuvers, that is to say maneuvers which, although having similar paths, their result with respect to the respective end formation is similar, can be removed from the set of maneuvers in order to further reduce the number of maneuvers and therefore the complexity of the calculation.

Figure 3:
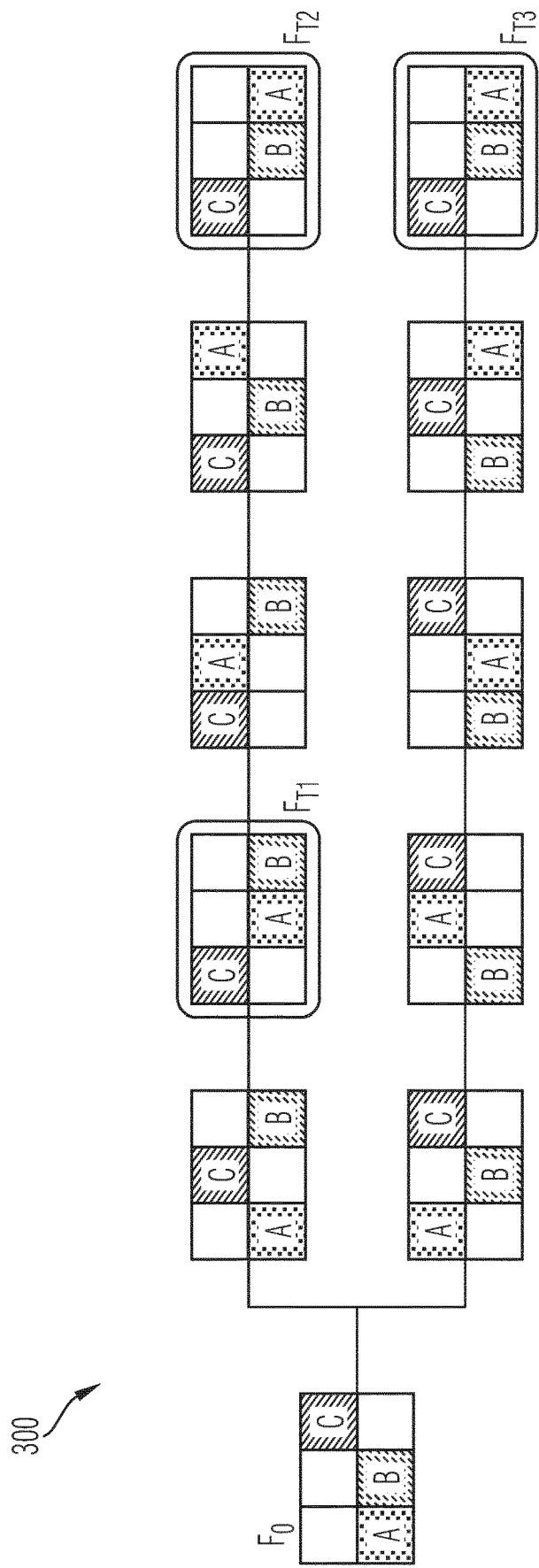
FIG. 3 schematically shows an iteratively expanded tree data structure for identifying maneuvers in the traffic scenario from FIG. 2.

FIG. 3 shows an iteratively expanded tree data structure and collective maneuvers for the exemplary traffic scenario from FIG. 2 which are derived as a result of the expansion of the tree data structure. Three possible end formations $F_{T1}$, $F_{T2}$ and $F_{T3}$ were determined on the basis of the starting formation $F_0$. The path from the starting formation $F_0$ to the end formation $F_{T1}$ specifies a first collective maneuver $M_1$, the path from the starting formation $F_0$ to the end formation $F_{T2}$ specifies a second collective maneuver $M_2$, the path from the starting formation $F_0$ to the end formation $F_{T3}$ specifies a third collective maneuver $M_3$. In the first collective maneuver, the vehicle A follows the vehicle B. In the second collective maneuver, the vehicle A overtakes the vehicle B before the vehicle C passes the vehicle B. In the third collective maneuver, the vehicle A overtakes the vehicle B after the vehicle C has passed the vehicle B.

After determining 106 the set of collective maneuvers, the method 100 can calculate 108 at least one trajectory for each collective maneuver from the set of collective maneuvers. Trajectories of a collective maneuver are preferably homotopic, that is to say a trajectory of the collective maneuver can be continuously transformed into another trajectory of the collective maneuver while complying with the predefined structural restrictions of the traffic scenario. A trajectory is preferably calculated for each object, for example each vehicle and/or each obstacle object, of each collective maneuver from the set of collective maneuvers. The calculated trajectories of a collective maneuver make it possible to compare the collective maneuver with another collective maneuver and with observations of actually traveled trajectories. In other words, the calculated trajectories represent a collective maneuver. In order to generate the trajectories of the collective maneuver, it is possible to formulate an optimization problem which minimizes a cost function under predefined conditions. The calculated trajectories are preferably cost-minimal trajectories for the collective maneuver.

The predefined conditions may comprise maneuver-dependent and/or maneuver-independent conditions. Maneuver-independent conditions may comprise one or more driving dynamics parameters which can be stipulated on the basis of the vehicle(s), for example. Maneuver-dependent parameters may be space-related parameters, for example on what side two vehicles pass the respective other vehicle and/or what safety distance with respect to one or more vehicles and/or obstacle objects must be complied with, and/or time-based parameters, for example in what order two or more vehicles pass through a critical area. For both types of parameters, space-based parameters and time-based parameters, the conditions should be stipulated in such a manner that a collision between two or more vehicles and/or a collision between a vehicle and an obstacle object is/are avoided.

The sequence of formations defining the maneuver can be used to derive, for example, whether and on what side a vehicle can pass an obstacle object and/or a vehicle. The sequence of formations of the maneuver can also be used to derive the order in which the vehicles pass and the order in which the obstacle object is passed by the vehicles. In order to reduce the computing complexity, the optimization problem can be divided into at least two sub-problems: an optimization problem for optimizing longitudinal control of the ego vehicle and an optimization problem for optimizing lateral control of the ego vehicle. The optimization problem for optimizing the longitudinal control ensures a passing order, whereas the optimization problem for optimizing the lateral control ensures a correct relationship in pairs. The longitudinal optimization is preferably carried out first and the results of the longitudinal optimization are used as an input for the lateral optimization. This has the advantage that the longitudinal positions of the vehicles and/or obstacle objects are known to the lateral optimization.

So that the trajectories of the maneuver from the set of maneuvers represent a general human driving behavior, a quadratic cost function can be selected. Acceleration, deviation from a desired speed and/or deviation from a lateral position can be included in the calculation of the trajectory or trajectories by means of the quadratic cost function. Furthermore, costs of all vehicles and/or obstacles can be taken into account in the cost function.

Figure 4:
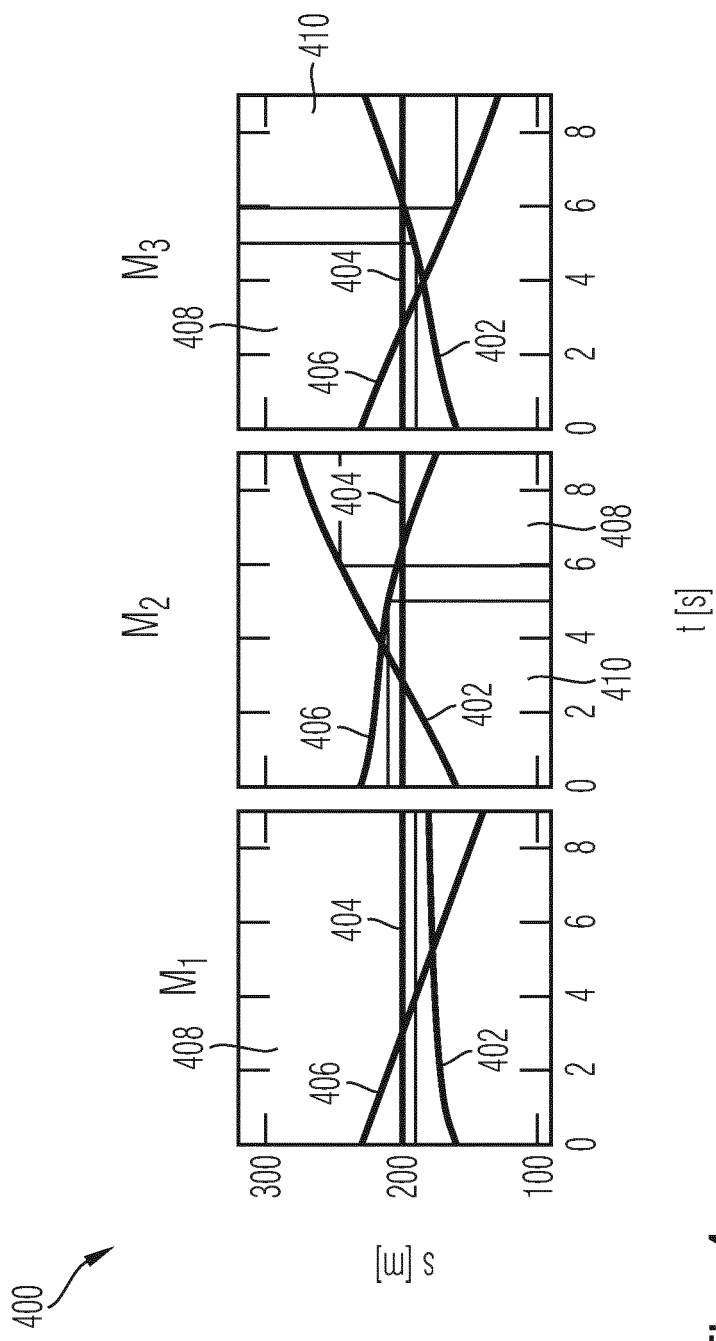
FIG. 4 schematically shows longitudinal optimization of the traffic scenario from FIG. 2.
Figure 5:
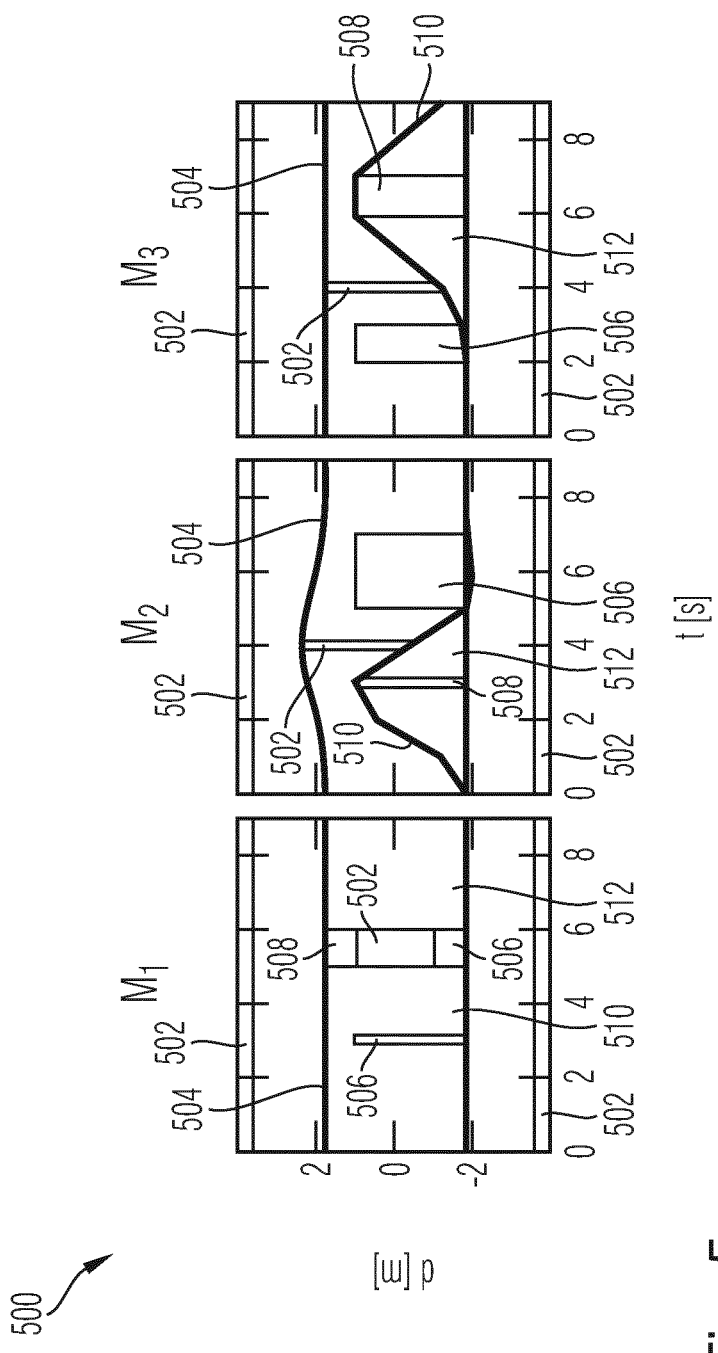
FIG. 5 schematically shows lateral optimization of the traffic scenario from FIG. 2.
Figure 6:
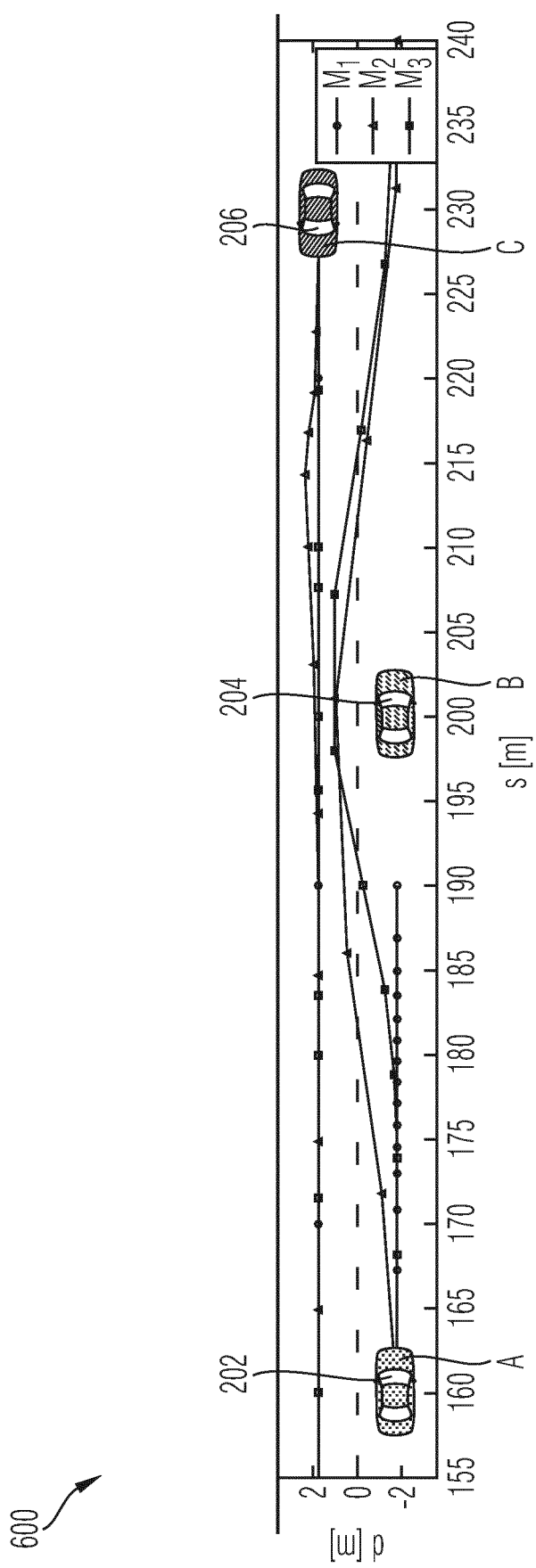
FIG. 6 schematically shows cost-optimized trajectories for the traffic scenario from FIG. 2.

FIG. 4 shows longitudinal optimization of the traffic scenario from FIG. 2 and the determined collective maneuvers $M_1$, $M_2$ and $M_3$ from FIG. 3, and FIG. 5 shows lateral optimization of the traffic scenario from FIG. 2 and the determined collective maneuvers $M_1$, $M_2$ and $M_3$ from FIG. 3. FIG. 6 shows the cost-optimized and cost-minimal trajectories for the determined collective maneuvers $M_1$, $M_2$ and $M_3$.

In FIG. 4, 402 shows the longitudinal trajectory of the ego vehicle 202, 404 shows the longitudinal trajectory of the stationary vehicle 204, and 406 shows the longitudinal trajectory of the further vehicle 206. Areas which must not be crossed by the longitudinal trajectory 402 of the ego vehicle are indicated using 408. Areas which must not be crossed by the longitudinal trajectory 406 of the further vehicle 206 are indicated using 410. The areas 408 and/or 410 can be dynamically adapted between the time steps in order to take into account movements of the vehicles, for example of the ego vehicle 202 and of the further vehicle 206.

In FIG. 5, the lateral trajectory of the ego vehicle 202 is indicated using 510, the lateral trajectory of the stationary vehicle 204 is indicated using 512, and the lateral trajectory of the further vehicle 206 is indicated using 504. Areas which must not be crossed by the lateral trajectory of the ego vehicle 202 and of the further vehicle 206 are indicated using 502, areas which must not be crossed by the lateral trajectory of the ego vehicle are indicated using 508, and areas which must not be crossed by the lateral trajectory of the further vehicle are indicated using 506.

If the longitudinal trajectories from FIG. 4 and the lateral trajectories from FIG. 5 of the respective vehicles and maneuvers are combined, the trajectories for the ego vehicle 202, the stationary vehicle 204 and the further vehicle 206, shown in FIG. 6, can be derived for the respective collective maneuvers $M_1$, $M_2$ and $M_3$. The trajectories shown in FIG. 6 can be directly traveled by the ego vehicle 202.

The method 100 can also determine 110 the maneuver of the ego vehicle on the basis of the calculated trajectory or the calculated trajectories for the collective maneuvers from the set of collective maneuvers and a movement of the at least one further vehicle, as captured by a sensor system of the ego vehicle. Precisely one collective maneuver from the set of collective maneuvers is determined in one time step. In a subsequent time step, another collective maneuver can be determined. Changing the collective maneuver between two time steps makes it possible to represent a behavior of a human driver who continuously assesses a traffic scenario and flexibly changes an intended maneuver if, for example, a change in the traffic scenario occurs or a reassessment of the traffic scenario results in a different maneuver.

In order to determine the collective maneuver of the ego vehicle from the set of collective maneuvers, the movement of the ego vehicle can be modeled as a stochastic process which comprises all collective maneuvers from the set of collective maneuvers, wherein only one collective maneuver from the set of collective maneuvers can be active in one time step. A maneuver change probability can also be defined. The maneuver change probability between two time steps for all collective maneuvers from the set of collective maneuvers is preferably 10%. The collective maneuver can be estimated using known estimation methods. A Kalman filter, for example an interactive multiple model, IMM for short, Kalman filter, can be used, for example, as the estimation method in order to estimate the collective maneuver or the states of the collective maneuver. Furthermore, probabilities for each collective maneuver can be determined on the basis of estimated states of the collective maneuvers, current measured values of an actual movement of the vehicle(s) in the traffic scenario and/or the maneuver change probability and a probability for each collective maneuver from the set of collective maneuvers can be determined using known Bayesian statistical methods. The collective maneuver with the highest probability can be selected by the ego vehicle and the calculated trajectory of the selected collective maneuver can be traveled.

Figure 7:
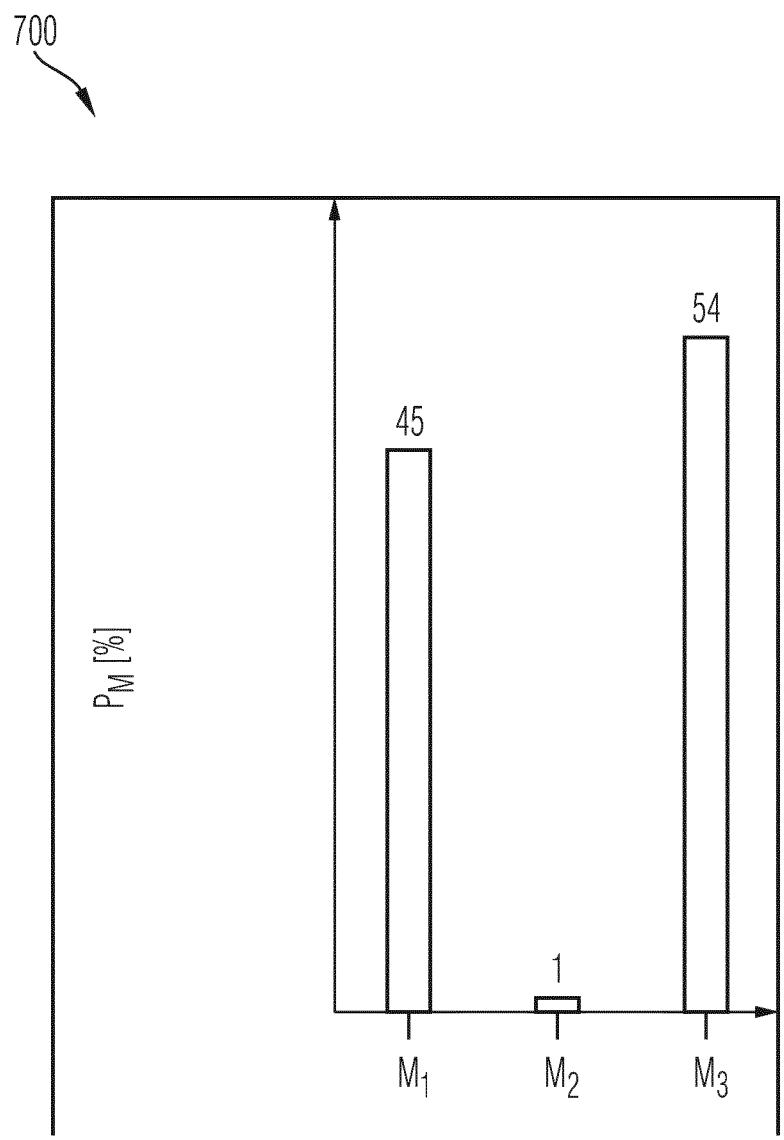
FIG. 7 schematically shows probabilities of possible maneuvers of the ego vehicle in the traffic scenario from FIG. 2.

FIG. 7 shows the calculated probabilities for the collective maneuvers $M_1$, $M_2$ and $M_3$. Of the three collective maneuvers $M_1$, $M_2$ and $M_3$, the collective maneuver $M_3$ has the highest probability. The ego vehicle will therefore select the collective maneuver $M_3$ in the traffic scenario from FIG. 2 and will travel the trajectory of the ego vehicle calculated in the collective maneuver $M_3$ in one or more time steps until another collective maneuver receives a higher probability in a subsequent time step.

A relative movement of vehicles with respect to one another or between vehicles and obstacle objects can be advantageously efficiently taken into account when determining a collective maneuver of vehicles by means of a formation-based representation of collective maneuvers. A process of finding possible collective maneuvers can be efficiently automated by using formations. As a result, an ego vehicle can estimate traffic situations in a more precise manner if the collective maneuver does not include the ego vehicle. The calculated trajectory for the determined collective maneuver can be directly traveled by the ego vehicle if the ego vehicle is a vehicle in the collective maneuver. The collective maneuver of the ego vehicle can therefore be efficiently re-determined for each time step with respect to the required computing resources. Furthermore, possible collective maneuvers themselves can be found by the ego vehicle on the basis of a current traffic scenario. The ego vehicle 202 can therefore react efficiently and flexibly to different and quickly changing traffic scenarios in a similar manner to a human driver by virtue of the ego vehicle 202 reassessing the traffic scenario in each time step in which the method is carried out. In this case, the ego vehicle can efficiently take into account relative movements between driving vehicles and relative movements with respect to static obstacle objects and can quickly determine a collective maneuver to be carried out.

LIST OF REFERENCE SIGNS

100 Method
102 Receiving a state
104 Determining a current formation
106 Determining a set of maneuvers 108 Calculating a trajectory
110 Determining the maneuver of the ego vehicle
200 Traffic scenario
202 Ego vehicle
204 Parked vehicle
206 Further vehicle
208 Box
210 Box
212 Box
214 Formation
300 Tree data structure of possible formations and maneuvers
400 Longitudinal optimization of trajectories
402 Trajectory of the ego vehicle
404 Trajectory of the stationary vehicle
406 Trajectory of the further vehicle
408 Restricted area of the ego vehicle
410 Restricted area of the further vehicle
500 Lateral optimization of trajectories
502 Restricted area of the ego vehicle and of the further vehicle
504 Trajectory of the further vehicle
506 Restricted area of the further vehicle
508 Restricted area of the ego vehicle
510 Trajectory of the ego vehicle
512 Trajectory of the stationary vehicle
600 Cost-optimized trajectories of the maneuvers
700 Probabilities of the maneuvers The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an autonomous ego vehicle, the method comprising:
   determining a current formation of the ego vehicle and at least one other vehicle, based on an ego-vehicle-state and an other-vehicle-state, wherein the current formation reflects relative positions of the ego vehicle and at least one other vehicle with respect to a road;
   determining a set of collective maneuvers, wherein each collective maneuver reflects a sequence of formations transitioning from the current formation to a respective end formation of the ego vehicle and the at least one other vehicle, wherein each formation of the sequence of formations reflects different relative positions of the ego vehicle and the at least one other vehicle within a cell occupancy map;
   calculating respective trajectories of the ego vehicle and the other vehicle for each collective maneuver of the set of collective maneuvers;
   determining a collective maneuver from the set of collective maneuvers, based on:
      the respective trajectories calculated for each collective maneuver, and
      sensor system captured movement of the ego vehicle and the at least one other vehicle; and
   controlling the ego vehicle to autonomously execute the collective maneuver.

2. The method according to claim 1, wherein the ego-vehicle-state and the other-vehicle-state each comprises a lane-accurate position thereof.

3. The method according to claim 2, wherein the current formation is further determined based on an obstacle-state, such that the current formation reflects relative positions of the ego vehicle, the at least one other vehicle, and an obstacle, with respect to the road.

4. The method according to claim 3, wherein the current formation and the end formation reflected by the current maneuver comprise at least one area which is free of vehicles and obstacles.

5. The method according to claim 2, wherein each formation reflects a predefined set of relative lateral and longitudinal positions between the ego vehicle and the at least one other vehicle.

6. The method according to claim 2, wherein the current formation and the end formation reflected by the current maneuver comprise at least one area free of vehicles and obstacles.

7. The method according to claim 2, wherein the respective trajectories are homotopic with respect to the current formation and identical respective end formations.

8. The method according to claim 1, wherein the current formation is further determined based on an obstacle-state, such that the current formation reflects relative positions of the ego vehicle, the at least one other vehicle, and an obstacle, with respect to the road.

9. The method according to claim 8, wherein each formation reflects a predefined set of relative lateral and longitudinal positions between the ego vehicle and the at least one other vehicle.

10. The method according to claim 8, wherein the current formation and the end formation reflected by the current maneuver comprise at least one area free of vehicles and obstacles.

11. The method according to claim 8, wherein the respective trajectories are homotopic with respect to the current formation and identical respective end formations.

12. The method according to claim 1, wherein each formation reflects a predefined set of relative lateral and longitudinal positions between the ego vehicle and the at least one other vehicle.

13. The method according to claim 1, wherein the current formation and the end formation reflected by the current maneuver comprise at least one area free of vehicles and obstacles.

14. The method according to claim 1, wherein determining the set of collective maneuvers comprises:
   generating a tree data structure having the current formation is as a root element thereof;
   calculating a first further formation using a predefined set of discrete movement actions, wherein the first further formation reflects changed positions of the ego vehicle and at least one other vehicle with respect to the current formation;
   adding the first further formation to the tree data structure;
   in response to determining that the first further formation is the respective end formation, adding the sequence of: the current formation and the end formation, as a collective maneuver to the set of collective maneuvers.

15. The method according to claim 14, wherein determining the set of collective maneuvers further comprises:
   in response to determining that the first further formation is not the respective end formation, calculating a second further formation using a predefined set of discrete movement actions, wherein the second further formation reflects changed positions of the ego vehicle and at least one other vehicle with respect to the first further formation;
   adding the second further formation to the tree data structure;

in response to determining that the second further formation is the respective end formation, adding the sequence of: the current formation, the first further formation, and the end formation, as the collective maneuver to the set of collective maneuvers,
wherein determining the set of collective maneuvers continues until no further formations can be calculated with the predefined set of discrete movements.

16. The method according to claim 1, wherein the trajectories are cost-optimized with respect to at least one vehicle-specific parameter and/or at least one maneuver-specific parameter.

17. The method according to claim 1, wherein the respective trajectories are homotopic with respect to the current formation and identical respective end formations.

18. A control unit for controlling an autonomous ego vehicle, wherein the control unit is configured to:
   determine a current formation of the ego vehicle and at least one other vehicle, based on an ego-vehicle-state and an other-vehicle-state, wherein the current formation reflects relative positions of the ego vehicle and at least one other vehicle with respect to a road;
   determine a set of collective maneuvers, wherein each collective maneuver reflects a sequence of formations transitioning from the current formation to a respective end formation of the ego vehicle and the at least one other vehicle, wherein each formation of the sequence of formations reflects different relative positions of the ego vehicle and the at least one other vehicle within a cell occupancy map;
   calculate respective trajectories of the ego vehicle and the other vehicle for each collective maneuver of the set of collective maneuvers;
   determine a collective maneuver from the set of collective maneuvers, based on:
      the respective trajectories calculated for each collective maneuver, and
      sensor system captured movement of the ego vehicle and the at least one other vehicle; and
   controlling the ego vehicle to autonomously execute the collective maneuver.

19. An autonomous ego vehicle, comprising a control unit for controlling the autonomous ego vehicle, wherein the control unit is configured to:
   determine a current formation of the ego vehicle and at least one other vehicle, based on an ego-vehicle-state and an other-vehicle-state, wherein the current formation reflects relative positions of the ego vehicle and at least one other vehicle with respect to a road;
   determine a set of collective maneuvers, wherein each collective maneuver reflects a sequence of formations transitioning from the current formation to a respective end formation of the ego vehicle and the at least one other vehicle, wherein each formation of the sequence of formations reflects different relative positions of the ego vehicle and the at least one other vehicle within a cell occupancy map;
   calculate respective trajectories of the ego vehicle and the other vehicle for each collective maneuver of the set of collective maneuvers;
   determine a collective maneuver from the set of collective maneuvers, based on:
      the respective trajectories calculated for each collective maneuver, and
      sensor system captured movement of the ego vehicle and the at least one other vehicle; and
   controlling the ego vehicle to autonomously execute the collective maneuver.

* * * * *